United States Patent [19]

Kominami et al.

[11] Patent Number: 5,663,284
[45] Date of Patent: Sep. 2, 1997

[54] COPOLYMERIZED POLYAMIDE AND A PRODUCTION PROCESS/THEREOF

[75] Inventors: Kazuhiko Kominami; Tooru Nishimura; Kazuhiko Kobayashi; Shoji Yamamoto, all of Aichi, Japan

[73] Assignee: Toray Industries, Inc., Japan

[21] Appl. No.: 516,049

[22] Filed: Aug. 17, 1995

[30] Foreign Application Priority Data

Aug. 17, 1994 [JP] Japan ................................ 6-193330
Oct. 3, 1994 [JP] Japan ................................ 6-239311

[51] Int. Cl.$^6$ ........................................... C08G 69/00
[52] U.S. Cl. .................. 528/310; 528/322; 528/335; 528/338; 528/339; 528/340; 528/347; 528/349
[58] Field of Search ........................... 528/310, 322, 528/349, 335, 340, 347, 338, 339

[56] References Cited

U.S. PATENT DOCUMENTS

| | | | |
|---|---|---|---|
| 5,302,691 | 4/1994 | Soelch ........................ | 528/349 |
| 5,322,923 | 6/1994 | Lahary et al. ............... | 528/349 |
| 5,336,754 | 8/1994 | Lahary et al. ............... | 528/349 |

FOREIGN PATENT DOCUMENTS

| | | |
|---|---|---|
| 0 123 377 A2 | 10/1984 | European Pat. Off. . |
| 0 395 414 A1 | 10/1990 | European Pat. Off. . |
| 5 043 681 | 2/1993 | Japan . |

*Primary Examiner*—Jeffrey C. Mullis
*Assistant Examiner*—P. Hampton-Hightower
*Attorney, Agent, or Firm*—Austin R. Miller

[57] ABSTRACT

A copolymerized polyamide, comprising amide bonds formed by an aliphatic diamine with 4 to 14 carbon atoms and terephthalic acid, with the existence ratios of distributed respectively adjacent amide bonds satisfying the following formulae (A) and (B), and with the half-crystallization time satisfying the following formula (C).

$$0.9 \leq [XY]obs./[XY]calcd. < 1.1 \quad (A)$$

$$0.9 \leq [XX]obs./[XX]calcd. < 1.1 \quad (B)$$

wherein X stands for an amide bond formed by an aliphatic diamine with 4 to 14 carbon atoms and terephthalic acid, and Y stands for any other amide bond than X. [XY] refers to the rate at which X and Y are adjacent to each other among all the amide bonds in the polymer structure, and [XX] refers to the rate at which X and X are adjacent to each other among all the amide bonds in the polymer structure. [XY] calcd. and [XX] calcd. are respectively the values of [XY] and [XX] calculated on the assumption that X and Y amide bonds are distributed statistically at random, and [XY] obs. and [XX] obs. are respectively the values of [XY] and [XX] measured from said copolymerized polyamide.

$$4.4 - 0.1(Tm - T) \leq \log t\tfrac{1}{2} < 5.5 - 0.1 \,(Tm - T) \quad (C)$$

$t\tfrac{1}{2}$ is the half-crystallization time (seconds). Tm is the melting point (°C.) of the copolymerized polyamide. T is the measuring temperature (°C.) of the half-crystallization time.

22 Claims, No Drawings

COPOLYMERIZED POLYAMIDE AND A PRODUCTION PROCESS THEREOF

BACKGROUND OF THE INVENTION

The present invention relates to a copolymerized polyamide and production process thereof. Particularly it relates to a high quality copolymerized polyamide excellent in moldability, heat resistance, chemicals resistance, etc. and a production process thereof.

Polyamides are widely used in the automobile industry and the electric and electronics industry as engineering plastics because of their excellent properties.

Conventionally used polyamides are mainly nylon 6 and nylon 66. In recent years, automobile engines have become higher in output and automobile engine rooms are packed more densely, which raises the atmospheric temperature, while the microelectronics industry has progressed to achieve smaller sizes and higher integration. In these situations, very thinly molded products which can withstand the use in a high temperature atmosphere are being demanded. However, nylon 6 and nylon 66 are respectively 220° C. and 260° C. in melting point (Tm), and even if they are reinforced by glass fibers, their critical heat distortion temperatures are the respective melting points.

Recently, as polyamide resin compositions which can withstand the use in a high temperature atmosphere, many compositions such as terephthalic acid-containing polyamide resins and their compositions, and their glass fiber-reinforced compositions were proposed (JP59-161428A, JP59-155426A, JP59-53536A, JP62-156130A, etc.). However, the polyamides containing terephthalic acid have had problems in moldability and coloring and been unsatisfactory in mechanical properties such as elongation, tensile strength, flexural strength and flexural modulus, and also in thermal deformability. Furthermore the production processes themselves are also liable to cause troubles. To solve these problems, various processes are proposed for polymerization to prepare polyamides.

From the viewpoint of decreasing heat history, the following polymerization processes are proposed: JP60-206827A proposes continuous polymerization at high temperature and high pressure in a short time, and JP2-41318A proposes continuous polymerization in a short time using a special apparatus. However, in these processes, changing specifics of the different kinds of products is complicated and ineffective. It has therefore demanded to develop a generally acceptable polymerization process. Change of articles is easy in batch polymerization, and there are several studies.

JP5-170895A and JP5-9381A propose to obtain a polyamide after forming a primary condensation product low in polymerization degree at a high pressure and at 250° C. As stated in JP5-170895, batch polymerization has a problem that precipitation as a solid phase is caused in a polymerization reactor, and to prevent it, it has been necessary to polymerize at a low temperature of lower than 250° C. or to polymerize at a high pressure of 23 kg/cm2-G or more. The primary condensation product thus obtained is low in relative viscosity, and when the polymerization degree is raised, enormous heat degrades the polymer color tone, crystallinity and melt stability, not allowing a polyamide with good quality to be obtained. For raising the polymerization degree, it is proposed to effect long-time solid-phase polymerization (JP2-41318) and to use an extruder for raising the polymerization degree in a molten state at high temperature (JP3-43417A, JP3-17156A, JP59-155433A, and JP5-43681A).

The solid-phase polymerization for raising the polymerization degree has a problem that it takes a very long time. On the other hand, raising the polymerization degree in a molten state requires a high temperature and is liable to cause thermal degradation, hence such problems as poorer color tone, lower mechanical strength and lower moldability. JP3-43417 uses tetrakis(2,4-di-t-butylphenyl)-4,4'-bisphenylene phosphonite as a heat resistant stabilizer for raising the polymerization degree. However, since the reaction is effected at 340° to 345°C., the improvement of heat history is insufficient. In view of this prior art, the present invention as described later has been completed. JP3-17156A and JP59-155433A use an extruder for raising the polymerization degree in continuous polymerization, but except the description "designed to let out from the degassing vent" at the time of extrusion, there is no method described for decreasing the heat history due to screw arrangement and forced degassing. JP5-43681A uses a phosphoric acid based compound as a catalyst for raising the polymerization degree, to raise the polymerization rate, but since a vent opened in atmosphere is used, no essential solving measure for degassing of condensed water, etc. is taken. Furthermore, the residence time of reaction is so long as to cause thermal degradation, and the product obtained is not satisfactory in properties.

In these copolymerized polyamides, the relationships between the distribution of respectively adjacent amide bonds and crystallization behavior on one hand and the intended properties on the other hand have not been known.

OBJECTS OF THE INVENTION

An object of the present invention is to present a copolymerized polyamide satisfactory in such properties as tensile strength, tensile elongation, flexural strength, flexural modulus, chemicals resistance and heat distortion temperature, and a production process thereof. Another object of the present invention is to present a highly practical terephthalamide-containing copolymerized polyamide excellent in melt stability, color tone and mechanical properties by specifying the distribution of respectively adjacent amide bonds and crystallization characteristics, and also a production process thereof.

SUMMARY OF THE INVENTION

The present invention presents a copolymerized polyamide, comprising amide bonds formed by an aliphatic diamine with 4 to 14 carbon atoms and terephthalic acid, with the existence ratios of distributed respectively adjacent amide bonds satisfying the following formulae (A) and (B), and with the half crystallization time satisfying the following formula (C).

$$0.9 \leq [XY]obs./[XY]calcd. < 1.1 \quad (A)$$

$$0.9 \leq [XX]obs./[XX]calcd. < 1.1 \quad (B)$$

$$4.4 - 0.1(Tm-T) < \log t_{1/2} < 5.5 - 0.1(Tm-T) \quad (C)$$

The present invention also presents a process for preparing a copolymerized polyamide containing amide bonds formed by an aliphatic diamine with 4 to 14 carbon atoms and terephthalic acid, with the existence ratios of distributed respectively adjacent amide bonds satisfying the following formulae (A) and (B), and with the half crystallization time satisfying the following formula (C):

$$0.9 \leq [XY]obs./[XY]calcd. < 1.1 \quad (A)$$

$$0.9 \leq [XX]obs./[XX]calcd. < 1.1 \quad (B)$$

$$4.4 - 0.1(T_m - T) \leq \log t_{1/2} \leq 5 \times 0.1(T_m - T) \tag{C},$$

comprising the steps of forming a primary condensation product with 5 kg/cm2 (493.4615 kPa)-G to less than 23 kg/cm2 (2269.9229 kPa)-G as the maximum pressure reached and with higher than 260° C. to 330°C. as the maximum temperature reached, and melt-extruding using a twin-screw extruder containing screw segments of 2 or less in (length of screw, L)/(outermost diameter of screw, D), for raising the polymerization degree.

(In the above formulae, X stands for an amide bond formed by an aliphatic diamine with 4 to 14 carbon atoms and terephthalic acid, and Y stands for any other amide bond than X. [XY] refers to the rate at which X and Y are adjacent to each other among all the amide bonds in the polymer structure, and [XX] refers to the rate at which X and X are adjacent to each other among all the amide bonds in the polymer structure. [XY] calcd. and [XX] calcd. are respectively the values of [XY] and [XX] calculated on the assumption that X and Y amide-bonds are distributed statistically at random, and [XY] obs. and [XX] obs. are respectively the values of [XY] and [XX] measured from said copolymerized polyamide. t½ is the semi-crystallization time (seconds). Tm is the melting point (°C.) of the copolymerized polyamide. T is the measuring temperature (°C.) of the half crystallization time. "log" stands for logarithm.)

DETAILED DESCRIPTION OF THE INVENTION

The copolymerized polyamide of the present invention contains amide bonds formed by an aliphatic diamine with 4 to 14 carbon atoms and terephthalic acid. Furthermore, the copolymerized polyamide of the present invention is recommended to be preferably 2.60° to 320° C., more preferably 270° to 310° C. in melting point. If the melting point is too low, the heat resistant resin intended in the present invention cannot be obtained, and if too high, a high temperature is required for working the resin, to cause such problems as foaming due to thermal decomposition reaction.

The aliphatic diamine with 4 to 14 carbon atoms can be selected from aliphatic alkylenediamines such as 1,4-diaminobutane, 1,5-diaminopentane, 1,6-diaminohexane, 1,5-diamino-2-methylpentane, 1,7-diaminoheptane, 1,8-diaminooctane, 1,9-diaminononane, 1,10-diaminodecane, 1,11-diaminoundecane, 1,12-diaminododecane, 1,13-diaminotridecane, and 1,14-diaminotetradecane. Among these aliphatic diamines, especially long-chain aliphatic diamines with more carbon atoms can be preferably used since they lower the water absorbability of the polyamides obtained. Any one or more in combination of them can be used. Among the aliphatic diamines with 4 to 14 carbon atoms, those with 6 carbon atoms such as 1,6-diaminohexane and 1,5-diamino-2-methylpentane can be preferably used, since the copolymerized polyamides produced are excellent in the balance between heat resistance and crystallinity.

The raw material for the other amide structural component than said terephthalamide structural component in the copolymerized polyamide of the present invention can be selected, for example, from lactams such as ε-caprolactam, ζ-enantholactam, η-capryllactam, and ω-laurolactam, said diamines, aliphatic alkylenediamines with 15 to 18 carbon atoms such as 1,15-diaminopentadecane, 1,16-diaminohexadecane, 1,17-diaminoheptadecane, and 1,18-diaminooctadecane, aromatic diamines such as phenylenediamine, aliphatic dicarboxylic acids with 2 to 18 carbon atoms such as oxalic acid, malonic acid, succinic acid, glutaric acid, adipic acid, pimelic acid, suberic acid, azelaic acid, sebacic acid, undecanedioic acid, dodecanedioic acid, brassylic acid, tetradecanoic diacid, pentadecanoic diacid, and octadecanoic diacid, aromatic dicarboxylic acids such as isophthalic acid, etc. Among the amide structural components derived from them, caproamide, hexamethyleneadipamide, and hexamethyleneisophthalamide can be favorably used singly or in combination in the present invention. If 1,6-diaminohexane is used as the aliphatic diamine ingredient of the terephthalic acid amide structural component, a hexamethyleneterephthalamide-containing copolymerized amide containing the following structural component (I):

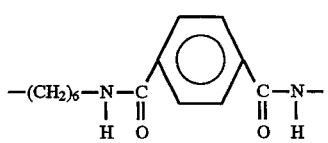

(hexamethyleneterephthalamide component (hereinafter called 6T)) and at least one structural component selected from the following components (II) to (IV):

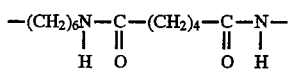

(hexamethyleneadipamide component (hereinafter called 66))

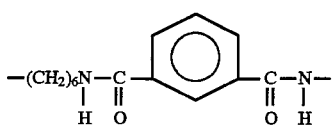

(hexamethyleneisophthalamide component (hereinafter called 6I))

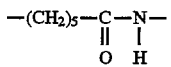

(caproamide component (hereinafter called 6)) is preferable.

In said 6T-containing copolymerized polyamide, if it is a binary copolymer of 6T/6I, the copolymerization ratio should be 45/55–20, preferably 55/45–80/20, more preferably 60/40–75/25 as a ratio by weight of raw materials. In the case of a binary copolymer of T/66, the copolymerization ratio should be 20/80–80/20, preferably 30/70–70/30, more preferably 30/70–60/40 as a ratio by weight of raw materials. Furthermore in the case of a binary copolymer of 6T/6, the copolymerization ratio should be 40/60–90/10, preferably 55/45–85/15, more preferably 60/40–80/20 as a ratio by weight of raw materials. The copolymerization ratio of these 6T-containing copolyamides is recommended to be selected to give a crystalline copolyamide with a melting point of 260° C. to 320° C. If the amount of 6T is smaller than the respective copolymerization ratios by weight of 45/55, 20/80 and 40/60 as a raw material of 6T/6I, 6T/66 and 6T/6, the melting point of the polymer is lowered to lower heat resistance such as heat distortion deformation temperature, and the decreased 6T content raises the water absorbability unpreferably. If the amount of 6T is larger than the respective copolymerization ratios by weight of 80/20, 80/20, 90/10 as a raw material of 6T/6I, 6T/66 and 6T/6, the melting point of the polymer is raised to improve the heat resistance, but the working temperature is so high as to cause the polymer to be thermally decomposed unpreferably.

Among these copolymerized polyamides, 6T/66 is especially preferable in view of crystallization characteristic, and if the copolymerization ratio by weight is in a range from 35/65 to 60/40, especially 37/63 to 50/50, the copolymerized polyamide obtained is excellent in properties.

The 6T-containing polyamide of the present invention can also be a ternary or higher-nary copolymer, and in this case, a preferable copolymer composition is 6T/66-containing composition such as 6T/66/6I and 6T/66/6. The 6T/66 content of the copolymerized polyamide is recommended to be preferably 50 wt % or more, more preferably 60 wt % or more, further more preferably 70 wt % or more.

As the aliphatic diamine in the terephthalamide structural component, a diamine with 12 carbon atoms can be also preferably used, and in this case (the bond component with terephthalic acid is hereinafter called 12T), a 12T-containing polyamide with such a component as hexamethyleneadipamide component, dodecamethyleneadipamide component, hexamethyleneisophthalamide component, dodecamethyleneisophthalamide component or caproamide component copolymerized can be preferably used.

The copolymerized polyamide of the present invention is substantially a random copolymer, and the existence ratios of distributed respectively adjacent amide bonds must satisfy the following formulae (A) and (B):

$$0.9 \leq [XY]obs./[XY]calcd. < 1.1 \quad (A)$$

$$0.9 \leq [XX]obs./[XX]calcd. < 1.1 \quad (B)$$

[where X stands for an amide bond formed by an aliphatic diamine with 4 to 14 carbon atoms and terephthalic acid, and Y stands for any other amide bond other than X. In the case of an amide bond consisting of three or more components, all the amide bonds than X are assumed to be the same and represented as Y. Furthermore, if there are two or more components corresponding to X as in 6T/12T, one component is assumed to be X, while the other is assumed to be Y. [XY] refers to the rate at which X and Y are adjacent to each other among all the amide bonds in the polymer structure, and [XX] refers to the rate at which X and X are adjacent to each other among all the amide bonds in the polymer structure. [XY] calcd. and [XX] calcd. are respectively the values of [XY] and [XX] calculated on the assumption that X and Y amide bonds are distributed statistically at random, and [XY] obs. and [XX] obs. are respectively the values of [XY] and [XX] measured from said copolymerized polyamide.]

Preferably, the existence ratios of distributed respectively adjacent amide bonds should satisfy the following formulae (D) and (E):

$$0.95 \leq [XY]obs./[XY]calcd. < 1.05 \quad (D)$$

$$0.95 \leq [XX]obs./[XX]calcd. < 1.05 \quad (E)$$

If the existence ratios of distributed respectively adjacent amide bonds do not conform to the formulae (A) or (B), the excellent mechanical properties of a random copolymer, for example, the balance between tensile strength and elongation, and such properties as heat distortion deformation temperature are lost since the block formation tendency is strong.

Furthermore, in the copolyamide of the present invention, the half crystallization time must satisfy the following formula (C).

$$4.4 - 0.1(Tm-T) \leq \log t\tfrac{1}{2} < 5.5 - 0.1(Tm-T) \quad (C)$$

[$t\tfrac{1}{2}$ is the half crystallization time (seconds). Tm is the melting point (C) of the copolymerized polyamide. T is the measuring temperature (C) of the half crystallization time, meaning a range from a temperature of 35° C. lower than the melting point of the copolymerized polyamide to a temperature of 25° C. lower, preferably meaning a temperature of 30° C. lower than the melting point of the copolymerized polyamide.

Furthermore in the copolymerized polyamide, it is especially preferable that the half crystallization time satisfies the following formula (F).

$$4.6 - 0.1(Tm-T) \leq \log t\tfrac{1}{2} \leq 5.3 - 0.1(Tm-T) \quad (F)$$

If log t½ is smaller than 4.4−0.1(Tm−T), the polymer is insufficient in toughness, and if larger than 5.5−0.1 (Tm−T), the crystallization time is so long as to make injection molding in fast cycles (especially in view of release from the mold) difficult. The copolymerized polyamide of the present invention can be produced according to the following method. A primary condensation product is prepared in first polymerization under specific conditions and melt-extruded by a twin-screw extruder equipped with specific screw segments, to be raised in polymerization degree in second polymerization. At first, how to prepare the primary condensation product is described below.

The primary condensation product can be obtained by supplying an aqueous solution of a monomer and the salt of a diamine and a dicarboxylic acid destined to be said copolymer composition, into a pressure polymerization reactor, etc., to make a solution with water as the solvent, and polymerizing with stirring. The raw material concentration of the solution should be 5 wt % or more, preferably 15 wt % or more, and 90 wt % or less, preferably 85 wt % or less.

The primary condensation product is prepared with the temperature and pressure raised with stirring. The polymerization temperature is raised and controlled in a range from the temperature occurring after supplying into the reactor or after the concentration effected as required as described later, to the maximum temperature reached. The polymerization pressure is controlled at lower than the maximum pressure reached, according to the progression of polymerization. The maximum temperature and the maximum pressure are not required to be reached when the polymerization has been completed, but can be reached at any time during polymerization.

The maximum pressure reached in the preparation of said primary condensation product by polymerization should be 5 kg/cm2 (493.4615 kPa)-G to lower than 23 kg/cm2 (2269.9229 kPa), preferably 10 kg/cm2 (986.923 kPa)-G to lower than 22 kg/cm2 (2171.2306 kPa)-G, more preferably lower than 20 kg/cm2 (1973.846 kPa)-G. If the maximum pressure reached is higher than 23 kg/cm2-G, the water content in the reaction system is so high as to adversely affect the rise of polymerization degree and the conversion into the primary condensation product. If the maximum pressure reached is lower than 5 kg/cm2-G, the primary condensation product may be precipitated in the polymerization reactor.

The maximum temperature reached in the preparation of the primary condensation product should be higher than 260° C. to 330° C. However, if the melting point of the intended copolymerized polyamide is lower than 280° C., the maximum temperature reached is generally higher than 260° C. to 300° C. or lower, preferably 290° C. or lower. If the melting point of the polyamide is 280° to 320° C., the maximum temperature reached is recommended to be set in a range higher than 20° C. below the melting point of the copolymerized polyamide, preferably higher than 15° C.

below the melting point, to lower than 10° C. above the melting point, preferably lower than 5° C. above the melting point. If the maximum temperature reached is 260° C. or lower, the polymerization degree of the primary condensation product cannot be sufficiently raised, and due to the difference in reactivity among the respective copolymer ingredients, the primary condensation product obtained is very high in the tendency of forming blocks in the distribution of amide bonds. The polymer obtained by raising the polymerization degree of such a primary condensation product still keeps the block formation tendency. If the maximum temperature reached exceeds 330° C., the heat history for the copolymerized polyamide is so large as to degrade the respective properties unpreferably.

After the primary condensation product has been prepared, it is discharged, preferably under water vapor pressurization. The water vapor pressure is required to be lower than the maximum pressure reached in the preparation of the primary condensation product, and is recommended to be preferably in a range from 10 kg/cm2 (986.923 kPa)-G below the maximum pressure reached to the maximum pressure reached. It is preferable that the water vapor pressure is kept during discharge, and that the polymerization reactor is supplied with water liquid or water vapor, to keep a certain water vapor pressure or to give a higher pressure during discharge. If water, preferably ion-exchanged water is supplied into the polymerization reactor by a fixed delivery pump from outside the system, it is preferable to preheat the water through a heat exchanger before supply. The heating temperature should be preferably 100° C. or higher, more preferably 150° C. or higher. It is more preferable for keeping the polymerization state stable that the heating temperature is the saturated water vapor temperature at the pressure in the polymerization reactor. If water vapor is supplied into the polymerization reactor from outside the system, the pressure of the boiler for water vapor generation must be higher than the pressure in the polymerization reactor. Furthermore, the temperature during discharge is recommended to be kept preferably in a range from 10° C. below the maximum temperature reached to the maximum temperature reached.

The primary condensation product of the present invention can be prepared and discharged at below the maximum temperature reached and at below the maximum pressure reached. As described in JP5-170895A, it is known that there is a high temperature and low pressure range in which the primary condensation product is precipitated and solidified. Polymerization at a higher pressure and at a low temperature with an intention to avoid the precipitation and solidification range does not allow the reaction to proceed sufficiently, unpreferably. The present invention preferably uses the primary condensation product polymerization conditions higher in temperature and lower in pressure than the conventional conditions, by terminating the reaction before the primary condensation product is precipitated under the conditions to allow precipitation and solidification. The temperature and pressure ranges to cause precipitation and solidification are decided by the composition of the polyamide, temperature, pressure and time. For example, when a primary condensation product of 66/6T=50/50 wt % is prepared, it begins to be precipitated and solidified about 5 hours later after quickly raising the temperature from room temperature to 265° C. and the pressure from atmospheric pressure to 27 kg/cm2 (2664.6921 kPa)-G and keeping at the temperature and the pressure. If it is quickly heated to 265° C. and pressurized to 22 kg/cm2 (2171.2306 kPa)-G and kept at the temperature and the pressure, it begins to be precipitated and solidified about 2 hours later. Even under these conditions, if the polymerization is terminated to discharge the product in less than 2 hours after start of keeping the conditions, no problem of precipitation and solidification occurs. The time to cause precipitation and solidification under the conditions should be 0.1 hour shorter, more preferably 0.2 hour shorter, further more preferably 0.5 hour shorter than the time to reach the start of precipitation. Furthermore, the total polymerization time (polymerization and discharge) should be 10 hours or less, preferably 7 hours or less, more preferably 5 hours or less, further more preferably 4 hours or less.

The precipitation and solidification during polymerization can also be effectively avoided by efficiently stirring in the periphery of the polymerization reactor. The clearance between the stirring blades and the wall Of the polymerization reactor-is recommended to correspond to preferably 10% or less of the radius of the polymerization reactor, more preferably 5% or less. When the clearance between the stirring blades and the wall of the polymerization reactor corresponds to 10% or less of the radius of the polymerization reactor, the rotating blades are recommended to occupy preferably 70% or more, more preferably 80% to less than 100% below the liquid level of the polymerization reactor in the periphery. Efficient stirring in the periphery of the polymerization reactor where reaction is liable to be caused by heating can retard the precipitation and solidification.

Before the polymerization to prepare the primary condensation product, as required, salt preparation and/or concentration can be effected. The salt preparation means to produce a salt from a dicarboxylic acid-and a diamine, and the pH is recommended to be kept in a range of preferably salt neutralization point pH ±0.5, more preferably salt neutralization point pH ±0.3. The concentration is recommended to be effected to preferably the concentration of the raw solution plus 2 to 90 wt %, more preferably the concentration of the raw solution plus 5 to 80 wt %. The concentration temperature is recommended to be preferably in a range from 90° to 220° C., more preferably 100° to 210° C., further more preferably 130° to 200° C. The concentration pressure is recommended to be 0 to 20 kg/cm2 (0 to 1973.846 kPa)-G, preferably 1 to 10 kg/cm2 (98.6923 kPa)-G. Usually, the concentration pressure is controlled below the pressure for preparing the primary condensation product. For promotion of concentration, the solvent can also be forcibly discharged using nitrogen current, etc. The concentration is effective for shortening the polymerization time.

The relative viscosity of the sulfuric acid solution containing 1% of the primary condensation product at 25° C. (JIS-K 6810 method) is recommended to be preferably 1.15 to 2.5, more preferably 1.2 or more, further more preferably 1.3 or more, still further more preferably 1.4 or more, and more preferably 2.3 or less, more preferably 2.0 or less, further more preferably 1.8 or less. If the relative viscosity is less than 1.15, the primary condensation product is very liable to form blocks, and it is necessary to prolong the polymerization time or raise the temperature for raising the polymerization degree, thus increasing the heat history given to the copolymerized polyamide. Furthermore, if the relative viscosity is higher than 2.5, the melt viscosity of the primary condensation product is too high, and it is difficult to smoothly discharge the prepared primary condensation product unpreferably. The water content of the primary condensation product is recommended to be 20 wt % or less, preferably 10 wt % or less, further more preferably 5 wt % or less. If the water content is larger than 20 wt %, it is difficult to raise the polymerization degree. The water content is generally controlled by drying the primary condensation product discharged into water, or sprinkling cooling water on the discharged high temperature primary condensation product, for evaporation by using the heat of the primary condensation product. Moreover, it is preferable that the primary condensation product is ground to a proper size before it is raised in polymerization degree.

A reactor ideal for preparing the primary condensation product is a batch reactor, or a series batch reactor with 1 to 3 cells. The method for melt-extruding the primary condensation product for raising its polymerization degree is described below.

In the present invention, the extruder used for raising the polymerization degree of the primary condensation product is a twin-screw extruder containing screw segments of 2 or less in L/D, where L is the length of the screw segment and D is the outer diameter, i.e., the outermost diameter formed when the screw segment is rotated. The use of short screw segments of 2 or less in L/D allows the polymer state in the cylinder to be delicately controlled, and a high quality copolymerized polyamide can be obtained. Especially for the purpose of obtaining a copolymerized polyamide with random structure without causing thermal deterioration, it is necessary to quickly raise the polymerization degree by sufficiently kneading under evacuation with the state in the cylinder controlled by the screw segments short in L/D. The rate of the screw segments of 2 or less in L/D is recommended to be 5% to 100%, preferably 30% or more, furthermore preferably 50% or more of the entire length of the screws.

The screw segments forming the screws of the twin-screw extruder include resin feed segments, mixing segments, etc., and forward full flight segments can be preferably used as resin feed segments. Preferable mixing segments include rotor segments, cut-out rotor segments, forward kneading segments, orthogonal kneading segments, reverse kneading segments, kneading neutral segments, gear kneading segments, pineapple kneading segments, twist kneading segments, reverse full flight segments, cut-out flight segments, etc., and one or more kinds of these segments in combination can be used. Seal ring segments, torpedo ring segments etc. can also be effectively used. The forward full flight segments include all the forward full flight structures, for example, different in flight pitch, sharply cut or wide in flight. Furthermore in view of control of polymerization reaction, it is effective to use one or more, preferably two or more reverse full flight segments. The other segments than forward full flight segments can be located centrally in one place or separately in many places. The use of other segments than forward full flight segments can effectively promote polymerization reaction. The L/D ratios of forward full flight segments and the other segments than forward full flight segments are selected to conform to the above mentioned rate of the screw segments of 2 or less in L/D, but it is preferable that the other segments than forward full flight segments include those of 2 or less in L/D, more preferably those of 0.2 to 1.8 in L/D.

The total length of the other segments than forward full flight segments is recommended to be 0% or more, preferably 3% or more, more preferably 5% or more, and on the other hand 70% or less, preferably 50% or less, more preferably, 45% or less in reference to the entire length of the screws. The number of threads of a screw can be optional, but is recommended to be preferably 1, 2 or 3, more preferably 2. The thread grooves can be either shallow or deep, but deep grooves are preferable.

The two screws of the twin-screw extruders in the present invention can rotate either in the same direction or in different directions, but in view of easier polymerization condition control, it is preferable that they rotate in the same direction. The rotational speed is recommended to be 50 rpm or more, preferably 70 rpm or more, and 800 rpm or less, preferably 500 rpm or less. A higher speed is better for shearing, stirring and the renewal of the resin surface for degassing of condensed water, but if too high, the shearing heat is so large as to deteriorate the resin. So, it is preferable to select a proper speed in the above range.

For the twin-screw extruder used in the present invention, the L/D for the entire screws is not especially limited, but is usually set at 10 or more, preferably 15 or more, and 100 or less, preferably 70 or less. If the ratio is smaller than 10 or larger than 100, it is difficult to effect stable polymerization.

The extrusion conditions for raising the polymerization degree by the extruder of the present invention are described below.

In the present invention, it is preferable that the polymerization degree raising by the extruder is effected within the residence time satisfying the following formula (G), with evacuation using said twin-screw extruder.

$$t \leq 5000 \times \Delta\eta r/(TR-280) \qquad (G)$$

where t: Residence time (seconds

Δ ηr: Variation of relative viscosity caused by polymerization degree raising

TR: Maximum temperature reached of resin during polymerization degree raising (°C.)

Furthermore, it is preferable to effect the polymerization degree raising within the residence time satisfying the following formula (H).

$$20 \leq t \leq 4000 \times \Delta\eta r/(TR-280) \qquad (H)$$

In general, the residence time of the extruder is different from place to place in the extruder, and the above residence time means the shortest residence time in the extruder. Heating for a period longer than required for polymerization degree raising causes physical properties to be deteriorated by thermal deterioration, and if the heating is too short, the polymerization degree cannot be raised. So, the residence time is recommended to be preferably in the above range. The variation (Δ ηr) of relative viscosity by polymerization degree raising is recommended to be preferably 0.2 or more, more preferably 0.5 or more. The maximum temperature of the resin reached during polymerization degree raising is recommended to be higher than the melting point, preferably higher than 10° C. above the melting point, and lower than 350° C., preferably lower than 340° C. If the maximum temperature reached is too high, thermal load is too large unpreferably even if the residence time is short. It is especially important to keep the temperature lower than 350° C. for preventing thermal decomposition and thermal deterioration of the polymer.

The evacuation during the polymerization degree raising by the extruder in the present invention is effected from one or more vents, and the vents are not limited in form. Evacuation is effected for removing the water generated by polymerization, to shift the chemical equilibrium, and effective evacuation is important for polymerization degree raising within a certain residence time. Therefore, the vacuum degree of the vents is recommended to be −500 mm Hg (−66.661 kPa) or less, preferably −600 mm Hg (−79.9932 kPa) or less. In addition to the vents with the above vacuum degree, a low vacuum degree vent and an atmosphere open vent can also be used together.

The polymerization degree of the copolymerized polyamide of the present invention is not especially limited. Usually it is practical that the relative viscosity ($\eta r$) of 1% sulfuric acid solution at 25° C. is 1.8 to 5.0, preferably 2.0 to 3.5.

In ordinary polyamide polymerization, it is general to supply raw materials to keep the total amount of carboxyl groups equal to the total amount of amino groups contained in the monomer and the salt of a dicarboxylic acid and a diamine. However, in the present invention, it is also possible to supply an excessive amount of the dicarboxylic acid or the amine as a raw material, to prepare a polyamide larger in the amount of end carboxyl groups or end amino groups. The polymerization reaction of the present invention allows the addition of a polymerization degree regulator for facilitating the polymerization degree adjustment of the polyamide and the polymerization degree adjustment in polymerization degree raising. The polymerization degree regulator can be usually selected from monoamine compounds and monocarboxylic acid compounds, preferably acetic acid, benzoic acid and stearic acid, especially preferably acetic acid and benzoic acid.

The polymerization of the present invention can use a phosphorus based catalyst, which can be preferably selected from hypophosphites, phosphates, hypophosphorous acid, phosphoric acid, phosphoric acid esters, polymetaphosphate, polyphosphates, phosphine oxides, phosphonium halogen compounds, etc., more preferably hypophosphites, phosphates, hypophosphorous acid and phosphoric acid. The hypophosphites preferably include, for example, sodium hypophosphite, potassium hypophosphite, calcium hypophosphite, magnesium hypophosphite, aluminum hypophosphite, vanadium hypophosphite, manganese hypophosphite, zinc hypophosphite, lead hypophosphite, nickel hypophosphite, cobalt hypophosphite, ammonium hypophosphite, etc., and among them, sodium hypophosphite, potassium hypophosphite, calcium hypophosphite and magnesium hypophosphite are especially preferable. The phosphates preferably include, for example, sodium phosphate, potassium phosphate, potassium dihydrogenphosphate, calcium phosphate, vanadium phosphate, magnesium phosphate, manganese phosphate, lead phosphate, nickel phosphate, cobalt phosphate, ammonium phosphate, diammonium hydrogenphosphate, etc. The phosphoric acid esters include, for example, ethyloctadecyl phosphate, etc. The polymetaphosphates include, for example, sodium trimetaphosphate, sodium pentametaphosphate, sodium hexametaphosphate, polymethaphosphoric acid, etc. The polyphosphates include, for example, sodium. tetrapolyphosphate, etc. The amount of the phosphorus based catalyst added is recommended to be preferably 0.0001 to 5 parts by weight, more preferably 0.001 to 1 part by weight against 100 parts by weight of the polyamide. It can be added at any time before completion of polymerization degree raising, but is recommended to be added preferably after supply of raw materials to completion of polymerization to prepare the primary condensation product. It can also be added many times. Furthermore, it can also be added in the form mixture of several kinds of phosphorus based catalysts.

The copolymerized polyamide of the present invention can further contain a filler which can be selected from glass fibers, glass beads, powdery or plate-like inorganic compounds such as talc, kaolin, wollastonite, mica, silica, alumina, diatomaceous earth, clay, gypsum, red iron oxide, graphite, titanium dioxide, zinc oxide, copper and stainless steel, polymer fibers (carbon fibers), etc. Among them, glass fibers are preferable. Especially preferable glass fibers are glass rovings, glass chopped strands, etc. made from continuous long fiber strands of about 3 to 20 μm in diameter. The amount of the filler used is recommended to be usually 1 part by weight or more, preferably 10 parts by weight or more, and 300 parts by weight or less, preferably 200 parts by weight or less, more preferably 100 parts by weight or less against 100 parts by weight of the polyamide resin composition. If the amount of the filler added exceeds 300 parts by weight, the flowability in molten state is poor, to make it difficult to injection-mold a thin product or to aggravate the appearance of the molded product unpreferably. The method for adding a filler to the copolymerized polyamide of the present invention is not especially limited, and any conventional method can be used. For example, a filler is dry-blended with polyamide pellets, and the mixture is melt-kneaded by a single-screw or twin-screw extruder. If a melting machine is used for raising the polymerization degree, the filler can also be added halfway in the melting machine.

The copolymerized polyamide of the present invention can have, as required, a catalyst, heat resistance stabilizer, weather resistance stabilizer, plasticizer, mold releasing agent, lubricant, crystalline nucleating agent, pigment, dye, other polymer, etc. added in any step of the polymerization to prepare the primary condensation product, melting for polymerization degree raising, compounding or molding. Examples of these additives are: heat resistance stabilizer (hindered phenol based stabilizer, hydroquinone based stabilizer, phosphite based stabilizer, their substitution products, copper iodide, potassium iodide, etc.), weather resistance stabilizer (resorcinol based stabilizer, salicylate based stabilizer, benzotriazole based stabilizer, benzophenone based stabilizer, hindered amine based stabilizer, etc.), mold releasing agent and lubricant (montanic acid and its metal salts, its esters, its half esters, stearyl alcohol, stearamide, various bisamides, bisurea, polyethylene wax, etc.), pigment (cadmium sulfide, Phthalocyanine, carbon black, etc.), dye (Nigrosine, etc.), other polymer (other polyamide, polyester, polycarbonate, polyphenylene ether, polyphenylene sulfide, liquid crystal polymer, polyether sulfone, ABS resin, SAN resin, polystyrene, acrylic resin, polyethylene, polypropylene, ethylene-α-olefin copolymer, ionomer resin, SBS, SEBS, etc.).

The compositions obtained by adding said reinforcing material, filler, additives, etc. to the copolymerized polyamide of the present invention are effective for electric and electronic parts, automobile and rolling stock parts, electric household and office appliance parts, computer parts, facsimile and copier parts, machine parts and other applications, concretely, switches, miniature slide switches, DIP switches, switch housings, lamp sockets, binding bands, connectors, connector housings, connector shells, IC sockets, coil bobbins, bobbin covers, relays, relay boxes, capacitor cases, interior parts of motors, small motor cases, gears & cams, dancing pulleys, spacers, insulators, fasteners, buckles, wire clips, bicycle wheels, casters, helmets, terminal boards, electric tool housings, starter insulators, spoilers, canisters, radiator tanks, chamber tanks, reservoir tanks, fuse boxes, air cleaner cases, air conditioner fans, terminal housings, wheel covers, suction and exhaust pipes, bearing retainers, cylinder head covers, intake manifolds, water pipe impellers, engine roll dampers, clutch releases, speaker diaphragms, heat resistant vessels, electronic oven parts, rice cooker parts, printer ribbon guides, etc.

EXAMPLES

The present invention is described below in more detail in reference to examples. In the examples and comparative examples, the respective properties were measured according to the following methods.

1) Melting Point (Tm)

On the melting curve obtained by measuring 8 to 10 mg of a sample at a heating rate of 20° C./min using DSC (Perkin-Elmer Model 7), the temperature showing the maximum value was taken as (T1). 8 to 10 mg of the sample was heated at a heating rate of 20° C./min, kept at T1+20°C. for 5 minutes, cooled at a cooling rate of 20° C./min to 30° C., kept at 30° C. for 5 minutes, and heated again at a heating rate of 20° C./min to T1+20° C. The maximum value of the melting curve in this case was taken as the melting point (Tm).

2) Relative Viscosity

According to JIS K 6810, 1 g of a sample was dissolved into 100 ml of 98% concentrated sulfuric acid, and the relative viscosity at 25° C. was measured. The relative viscosity is hereinafter expressed as ηr.

3) Residence Time

During polymerization degree raising by an extruder, a color pigment was fed from a feeder, and the time taken till the molten polymer began to be colored was measured.

4). Color Tone

The YI value was measured using a color computer produced by Suga Shikenki K. K.

5) Tensile Strength and Tensile Elongation Measured according to ASTM D 638.

6) Flexural Strength and Flexural Modulus Measured according to ASTM D 790.

6) Chemicals Resistance (LLC Resistance

7) Chemicals Resistance (LLC Resistance)

An ASTM No. 1 dumbbell was immersed in an aqueous solution containing 50 wt % of LLC (Toyota genuine Long Life Coolant produced by Toyota Motor Corp.), and treated at 130° C. in an autoclave for 500 hours. The tensile strength was measured according to ASTM D 638.

8) Heat Distortion Temperature (DTUL)

Measured according to ASTM D 648 at a load of 4.6 kgf/cm2 (453.98458 kPa).

9) Half-Crystallization Time

DSC (Perkin-Elmer Model 7) was used to heat 8 to 10 mg of a sample at a heating rate of 20° C./min up to the melting point (Tm) plus 20° C., kept at the temperature for 5 minutes, and quickly cooled down to the measuring time (T) of the crystallization time. The time (seconds) taken to reach the heat absorption peak was measured as t1/2.10) The existence ratios of distributed respectively adjacent amide bonds JNR-GSX400, FT-NMR (Nippon Denshi K. K.) was used, to measure 13C-NMR by dissolving 100 mg of a sample into 0.7 ml of hexafluoroisopropanol/deuteriorated benzene mixture. The measuring sensitivity was raised to the maximum, and the existence ratios were determined by calculation from the distribution of absorption intensities attributable to the carbonyl carbons of respective amide bonds. For example, in the case of 6T/66, the rate at which 6T and 6T were adjacent to each other (corresponding to [XX] obs. in the claim), and the rate at which 6T and 66 were adjacent to each other (corresponding to [XY] obs. in the claim) were measured. The [XX] calcd. and [XY] calcd were calculated as rates at which the respective components were adjacent to each other, assuming that the respectively adjacent amide bonds were distributed statistically at random. From these values, the existence ratios of distributed respectively adjacent amide bonds, [XX] obs./[XX] calcd. and [XY] obs./[XY] calcd. were calculated.

Respective examples are described below. Tables 1 and 2 show reaction conditions, properties, etc., and also the amount of each monocarboxylic acid added. The amount is molar times against the total number of moles of the component monomer, and of the dicarboxylic acid and the diamine as ingredients of the salt formed.

Example 1

Hexamethylenediammonium adipate (66 salt), terephthalic acid, hexamethylenediamine, benzoic acid, ion-exchanged water and sodium hypophosphite as the composition at the concentrations shown in Table 1 were put into a 0.10 m3 batch type pressure polymerization reactor, in which the clearance between the stirring blends and the reactor wall corresponding to 1 to 3% of the radius of the reactor occupied 95% of the side face below the liquid level, and the internal atmosphere was sufficiently substituted by nitrogen. Then, the mixture was heated to 140° C. and concentrated with stirring at a pressure of 4.0 kg/cm2 (394.7692 kPa)-G up to a concentration of 85 wt %. In succession, with stirring, the mixture was heated to reach a maximum temperature of 290° C., taking 1.5 hours, with the maximum polymerization pressure at 20 kg/cm2 (1973.846 kPa)-G. The product was discharged taking 0.1 hour, while ion-exchanged water was fed at a rate of 3 liters/hr by a fixed delivery pump, with the water vapor pressure kept at 20 kg/cm2-G. The primary condensation product was 1.6 in viscosity hr and 297° C. in melting point.

The obtained primary condensation product was dried in vacuum at 100° C. for 24 hours, and raised in polymerization degree by an extruder. The extruder used was a 30 mm dia. vent type twin-screw extruder (L/D=45.5) with the two screws rotated in the same direction and with deep thread grooves. The screws were composed of forward full flight segments and other segments than forward full flight segments respectively of 2 or less in L/D, and the forward full flight segments accounted for 78% of all the segments, while the other segments than the forward full flight segments (forward kneading segments, reverse kneading segments, reverse full flight segments and seal ring segments of 0.5 to 1 in L/D) accounted for 22%. They were arranged in three places, that is, immediately upstream of a long vent, immediately upstream of a short vent and a melting zone. The residence time was 85 seconds, and evacuation was effected from the long vent of 5 in L/D at a vacuum degree of −700 mm Hg (−93.3254 kPa) and from the short vent of 1.8 in L/D at a vacuum degree of −700 mm Hg (−93.3254 kPa). The primary condensation product was molten at a maximum resin temperature of 325° C. at a screw speed of 150 rpm, to be raised in polymerization degree, thereby obtaining white pellets of 2.5 in relative viscosity hr and 305° C. in melting point. The existence ratios of distributed respectively adjacent amide bonds were obtained by calculation from the ratios of four peaks of 170.90 ppm, 170.92 ppm, 177.31 ppm and 177.33 ppm respectively obtained by high resolution measurement of 13C-NMR. [XX] obs./[XX] calcd. and [XY] obs./[XY] calcd. were respectively found to be 1.00 and 0.98. The polymerization conditions, the existence ratios of distributed respectively adjacent amide bonds, crystallization characteristic and measurement results of the copolymerized polyamide are shown in Table 1.

Example 2

The salt made from terephthalic acid and hexamethylenediamine, hexamethylenediammonium adipate(66 salt), e-caprolactam, acetic acid, phosphoric acid and distilled water as the composition at the concentrations shown in Table 1 were supplied, and as done in Example 1, a primary condensation product was obtained by polymerization at a maximum temperature reached of 262° C. at a maximum polymerization pressure of 22 kg/cm2

(2171.2306 kPa)-G at a water vapor pressure of 22 kg/cm2 (2171.2306 kPa)-G at the time of discharge, with a total time of 1.3 hours for polymerization and discharge. The primary condensation product obtained was dried in vacuum at 100° C. for 24 hours, and raised in polymerization degree by an extruder. The extruder used was a 30 mm dia. vent type twin-screw extruder (45.5 in L/D) with the two screws rotated in the same direction and with deep thread grooves. The screws consisted of 60% of forward full flight segments and other segments than forward full flight segments respectively of 2 or less in L/D, and 40% of forward full flight segments of more than 2 in L/D. The other segments than forward full flight segments (forward kneading segments, reverse kneading segments, orthogonal kneading segments, reverse full flight segments and seal ring segments of 0.5 to 1 in L/D) accounted for 15%. The segments were arranged in three places, that is, immediately upstream of a long vent, immediately upstream of a short vent and a melting zone. The residence time was 105 seconds, and evacuation was effected at a vacuum degree of −700 mm Hg (93.3254 kPa) from the long vent of 5 in L/D and at a vacuum degree of −700 mm Hg (93.3254 kPa) from the short vent of 1.8 in L/D. The primary condensation product was molten to be raised in polymerization degree at a screw speed of 200 rpm at a maximum resin temperature of 325° C., to obtain white pellets of 2.5 in relative viscosity hr and 294° C. in melting point. The existence ratios of distributed respectively. adjacent amide bonds were obtained by calculation from the ratios of nine peaks of 39.94 ppm, 40.58 ppm, 170,21 ppm, 170.90 ppm, 170,92 ppm, 177.31 ppm and 177.33 ppm respectively obtained by high resolution measurement of 13C-NMR, and [XX] obs./[XX] calcd. and [XY] obs./{XY} calcd. were found to be respectively 1.06 and 0.94. The polymerization conditions, the existence ratios of distributed respectively adjacent amide bonds, crystallization characteristic and measurement results of the copolymerized polyamide are shown in Table 1.

Example 3

Hexamethylenediammonium-adipate (66 salt), the salt made from terephthalic acid and hexamethylenediamine, benzoic acid and ion-exchanged water as the composition at the concentrations shown in Table 1 were supplied into a 0.1 m3 batch type pressure polymerization reactor, and sodium hypophosphite was further added still after obtaining the primary condensation product. As done in Example 1, the primary condensation product was polymerized to be raised in polymerization degree. The polymerization conditions, the existence ratios of distributed respectively adjacent amide bonds, crystallization characteristic and measurement results of the copolymerized polyamide are shown in Table 1.

Example 4

Hexamethylenediammonium adipate (66 salt), and the salt made from terephthalic acid and hexamethylenediamine were used as raw materials, and a primary condensation product was obtained by polymerization as done in Example 1, using a 0.1 m3 batch type pressure polymerization reactor. The primary condensation product could be well discharged after a total polymerization time of 4 hours. Furthermore, as done in Example 1, it was raised in polymerization degree. The polymerization conditions, the existence ratios of distributed respectively adjacent amide bonds, crystallization characteristic and measurement results of the copolymerized polyamide are shown in Table 1.

Example 5

As done in Example 1, a primary condensation product was obtained by polymerization without using any phosphorus based catalyst, and it was raised in polymerization degree using the same vent type twin-screw extruder as used in Example 1. The polymerization conditions, the existence ratios of distributed respectively adjacent amide bonds, crystallization characteristic and measurement results of the copolymerized polyamide are shown in Table 1.

According to the methods of Examples 1 through 5, primary condensation products could be favorably obtained, and the polymers obtained by further raising their polymerization degrees had random structures judging from their existence ratios of distributed respectively adjacent amide bonds and were appropriate also in half-crystallization time. Therefore, the polyamides obtained were good in moldability and excellent in color tone, tensile strength, tensile elongation, flexural strength, flexural modulus, chemicals resistance and heat distortion temperature.

Comparative Example 1

Raw materials as used in Example 1 were put into a reactor, and a primary condensation product was obtained by polymerization as done in Example 1, except that the maximum temperature reached was 245° C. The primary condensation product obtained was 286° C. in melting point and 1.14 in hr.

The primary condensation product obtained was dried in vacuum at 100° C. for 24 hours, and raised in polymerization degree with a long residence time of 210 seconds taken, to achieve a relative viscosity of 2.5 under the same conditions as in Example 1. The polymerization conditions, the existence ratios of distributed respectively adjacent amide bonds, crystallization characteristic and measurement results of the copolymerized polyamide are shown in Table 2.

Comparative Example 2

Raw materials as used in Example 1 were put into a reactor, and a primary condensation product was obtained by polymerization as done in Example 1, except that the maximum pressure reached was 50 kg/cm2 (4934.615 kPa). The primary condensation product obtained was 285° C. in melting point and 1.14 in η r.

The primary condensation product obtained was dried in vacuum at 100° C. for 24 hours, and raised in polymerization degree with the residence time kept as long as 210 seconds to achieve a relative viscosity of 2.5 as done in Example 1. The polymerization conditions, the existence ratios of distributed respectively adjacent amide bonds, crystallization characteristic and measurement results of the copolymerized polyamide are shown in Table 2.

Comparative Example 3

Raw materials as used in Example 1 were put into a reactor, and a primary condensation product was attempted to be obtained as done in Example 1, except that the maximum temperature reached was 335° C. Precipitation and solidification occurred in the polymerization reactor and did not allow discharge.

Comparative Example 4

A primary condensation product as obtained in Example 1 was dried in vacuum at 100° C. for 24 hours, and raised in polymerization degree by a 20 mm dia. vent type single-screw extruder with an integral screw without any mixing zone. The residence time was 250 seconds, and evacuation was effected at a vacuum degree of −700 mm Hg (−93.3254 kPa) from a short vent of 1.8 in L/D. The primary condensation product was raised in polymerization degree at a screw speed of 150 rpm at a maximum resin temperature of 325° C. The polymerization conditions, the existence ratios of distributed respectively adjacent amide bonds, crystallization characteristic and measurement results of the copolymerized polyamide are shown in Table 2.

Comparative Example 1 adopted a low maximum temperature reached for the polymerization to obtain the primary condensation product. Comparative Example 2 adopted a high maximum pressure reached for the polymerization to obtain the primary condensation product. In either of the examples, the primary condensation product was not raised in polymerization degree, and the existence ratios of distributed respectively adjacent amide bonds of the polymer obtained after polymerization degree raising did not conform to the theoretical random structure. As a result, the polymers were poor in moldability, color tone and mechanical properties. Comparative Example 3 did not allow the intended primary condensation product to be discharged since the maximum temperature reached in the polymerization to obtain the primary condensation product was too high. Comparative Example 4 was very long in half-crystallization time since specific screw segments were not used for efficient raising of polymerization degree. As a result, moldability was very low, and polymer properties were poor.

TABLE 1

| Item | Unit | Example 1 | Example 2 | Example 3 | Example 4 | Example 5 |
|---|---|---|---|---|---|---|
| Primary condensation product | | | | | | |
| Polyamide composition ratio | Composition (Wt %) | 6T/66 55/45 | 6T/66/6 55/40/5 | 6T/66 45/55 | 6T/66 35/65 | 6T/66 35/65 |
| Amount of monocarboxylic acid added[*1)] | Molar time | 0.01(B) | 0.01(A) | 0.01(B) | 0.01(A) | 0.01(A) |
| Concentration in aqueous solution | Wt % | 60 | 85 | 60 | 65 | 65 |
| Amount of phosphorus based catalyst[*2)] added | Parts by weight | 0.05(X) | 0.04(Y) | 0.02(X) | 0.03(X) | — |
| Time when phosphorus based catalyst was added[*3)] | — | L | L | M | L | — |
| Concentrating temperature | °C. | 140 | — | 150 | 140 | 140 |
| Concentrating pressure | kg/cm$^2$-G | 4.0 | — | 5.0 | 4.0 | 4.0 |
| Concentration after completion of concentration | Wt % | 85 | — | 90 | 80 | 80 |
| Maximum temperature reached during polymerization | °C. | 290 | 262 | 280 | 280 | 290 |
| Maximum pressure reached during polymerization | kg/cm$^2$-G | 20 | 22 | 18 | 17 | 15 |
| Water vapor pressure during discharge | kg/cm$^2$-G | 20 | 22 | 18 | 17 | 12 |
| Total time of polymerization and discharge | Hours | 1.6 | 1.3 | 3 | 4 | 3.5 |
| ηr of primary condensation product | — | 1.6 | 1.3 | 1.5 | 1.6 | 2.2 |
| Discharge stability | — | Good | Good | Good | Good | Good |
| Melting point of primary condensation product | °C. | 297 | 284 | 287 | 279 | 279 |
| Polymerization degree raising | | | | | | |
| Amount of sodium hypophosphite added | Parts by weight | — | — | 0.02 | — | — |
| Vacuum degree of long vent | mmHg | −700 | −700 | −700 | −700 | −400 |
| Vacuum degree of short vent | mmHg | −700 | −700 | −700 | −700 | −400 |
| Rate of segments of 2 or less in L/D | % | 100 | 60 | 100 | 100 | 100 |
| Rate of other segments than forward full flight segments | % | 22 | 15 | 30 | 30 | 0 |
| Maximum resin temperature | °C. | 325 | 325 | 305 | 300 | 300 |
| Residence time | Seconds | 85 | 105 | 100 | 90 | 95 |
| ηr of polyamide copolymer | — | 2.5 | 2.5 | 2.6 | 2.5 | 2.5 |
| Melting point of polyamide copolymer | °C. | 305 | 294 | 290 | 280 | 280 |
| $[XX]_{obs}/[XX]_{calcd}$ | — | 1.00 | 1.06 | 1.02 | 1.02 | 1.00 |
| $[XY]_{obs}/[XY]_{calcd}$ | — | 0.98 | 0.94 | 1.00 | 0.98 | 0.98 |
| $T_{1/2}$ (Tm − T = 30) | sec | 80 | 110 | 75 | 70 | 70 |
| Physical properties | | | | | | |
| Moldability (mold releasability) | — | good | good | good | good | good |
| Color tone (YI value) | — | 27 | 35 | 25 | 22 | 42 |
| Tensile strength | kg/cm$^2$ | 980 | 920 | 920 | 900 | 810 |
| Tensile elongation | % | 30 | 50 | 60 | 75 | 15 |
| Flexural strength | kg/cm$^2$ | 1450 | 1350 | 1300 | 1300 | 1100 |
| Flexural modulus | kg/cm$^2$ | 32000 | 29000 | 27500 | 27500 | 25500 |
| Chemicals resistance (LLC resistance) | kg/cm$^2$ | 430 | 350 | 380 | 370 | 290 |
| Heat distortion temperature (DTUL) | °C. | 255 | 245 | 245 | 240 | 240 |

[*1)]A: Acetic acid B: Benzoic acid
[2)]X: Sodium hypophosphite Y: Phosphoric acid
[3)]L: When raw materials were supplied M: After completion of concentration

TABLE 2

| Item | Unit | Comparative example 1 | Comparative example 2 | Comparative example 3 | Comparative example 4 |
|---|---|---|---|---|---|
| Primary condensation product | | | | | |
| Polyamide composition ratio | Composition (Wt %) | 6T/66 55/45 | 6T/66 55/45 | 6T/66 55/45 | 6T/66 55/45 |
| Amount of monocarboxylic acid added[*1)] | Molar time | 0.01(B) | 0.01(B) | 0.01(B) | 0.01(B) |
| Concentration in aqueous solution | Wt % | 60 | 60 | 60 | 60 |
| Amount of phosphorus based catalyst[*2)] added | Parts by weight | 0.05(X) | 0.05(X) | 0.05(X) | 0.05(X) |
| Time when phosphorus based catalyst was added[*3)] | — | L | L | L | L |
| Concentrating temperature | °C. | 140 | 140 | 140 | 140 |
| Concentrating pressure | kg/cm$^2$-G | 4.0 | 4.0 | 4.0 | 4.0 |
| Concentration after completion of concentration | Wt % | 85 | 85 | 85 | 85 |
| Maximum temperature reached during polymerization | °C. | 245 | 290 | 335 | 290 |
| Maximum pressure reached during polymerization | kg/cm$^2$-G | 20 | 50 | 20 | 20 |
| Water vapor pressure during discharge | kg/cm$^2$-G | 20 | 50 | 20 | 20 |
| Total time of polymerization and discharge | Hours | 1.6 | 1.6 | 2.5 | 1.6 |
| η r of primary condensation product | — | 1.14 | 1.14 | — | 1.6 |
| Discharge stability | — | Good | Good | Discharge impossible | Good |
| Melting point of primary condensation product | °C. | 286 | 285 | — | 297 |
| Polymerization degree raising | | | | | |
| Amount of sodium hypophosphite added | Parts by weight | — | — | — | — |
| Vacuum degree of long vent | mmHg | −700 | −700 | — | none |
| Vacuum degree of short vent | mmHg | −700 | −700 | — | −700 |
| Rate of segments of 2 or less in L/D | % | 100 | 100 | — | 0 |
| Rate of other segments than forward full flight segments | % | 22 | 22 | — | 0 |
| Maximum resin temperature | °C. | 325 | 325 | — | 325 |
| Residence time | Seconds | 210 | 210 | — | 250 |
| η r of polyamide copolymer | — | 2.5 | 2.5 | — | 2.5 |
| Melting point of polyamide copolymer | °C. | 297 | 297 | — | 295 |
| [XX]$_{obs}$/[XX]$_{calcd}$ | — | 1.13 | 1.12 | — | 0.98 |
| [XY]$_{obs}$/[XY]$_{calcd}$ | — | 0.89 | 0.88 | — | 1.00 |
| T$_{1/2}$ (Tm − T = 30) | sec | 310 | 300 | — | 550 |
| Physical properties | | | | | |
| Moldability (mold releasability) | — | inferior | inferior | — | inferior |
| Color tone (YI value) | — | 95 | 90 | — | 105 |
| Tensile strength | kg/cm$^2$ | 815 | 810 | — | 810 |
| Tensile elongation | % | 5 | 5 | — | 10 |
| Flexural strength | kg/cm$^2$ | 950 | 950 | — | 950 |
| Flexural modulus | kg/cm$^2$ | 22500 | 22500 | — | 21000 |
| Chemicals resistance (LLC resistance) | kg/cm$^2$ | 200 | 210 | — | 180 |
| Heat distortion temperature (DTUL) | °C. | 150 | 160 | — | 140 |

[*1)]A: Acetic acid B: Benzoic acid
[2)]X: Sodium hypophosphite Y: Phosphoric acid
[3)]L: When raw materials were supplied M: After completion of concentration

What is claimed is:

1. A copolymerized polyamide, comprising:

1) a terephthalamide having a structure (I) of the following formula:

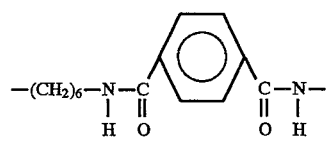

formed from an aliphatic diamine component and a terephthalic acid component, and 2) at least one of another amide other than said terephthalamide selected from the group consisting of:

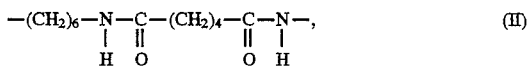

and

and wherein amide bonds X and Y connect said components, said amide bonds being in accordance with the following formulae (A) and (B):

$$0.9 \leq (XY)\text{actual}/(XY)\text{calcd.} < 1.1 \quad (A)$$

$$0.9 \leq (XX)\text{actual}/(XX)\text{calcd.} < 1.1 \quad (B)$$

and wherein X is an amide bond formed between said aliphatic diamine component having 4 to 14 carbon atoms and said terephthalic acid component, and Y is any amide bond other than X in the polymer structure, (XY) is the frequency of occurrence at which an X amide bond and a Y amide bond occur adjacent to each other relative to all amide bonds present in the polymer structure, (XX) is the frequency of occurrence at which amide bonds X and X occur adjacent to each other relative to all amide bonds in the polymer structure, (XY) calcd. and (XX) calcd. are respectively the values of (XY) and (XX) calculated on the assumption that all of the X and Y amide bonds that are present in the polymer structure are distributed statistically at random, and (XY) actual and (XX) actual are respectively the values of (XY) and (XX) as actually measured from said copolymerized polyamide; and said copolymerized polyamide having a half-crystallization time which is in accordance with the following formula (C):

$$4.4 - 0.1(T_m - T) \leq \log t_{1/2} < 5.5 - 0.1(T_m - T) \quad (C)$$

wherein $t_{1/2}$ is the half-crystallization time of the copolymerized polyamide in seconds, Tm is the melting point in °C. of the copolymerized polyamide, and T is the temperature in °C. at which the half-crystallization time is measured.

2. The copolymerized polyamide of claim 1, wherein said melting point of said copolymerized polyamide is 260° to 320° C.

3. The copolymerized polyamide of claim 1 wherein said aliphatic diamine has 6 carbon atoms.

4. The copolymerized polyamide of claim 1, wherein said structural components (I) and (II) comprise 50 wt % or more of said copolymerized polyamide, and wherein the weight ratio (I)/(II) is in a range from 80/20–20/80.

5. The copolymerized polyamide of claim 1, wherein said amide bonds are in accordance with the following formulae (D) and (E):

$$0.95 \leq [XY]\text{actual}/[XY]\text{calcd.} < 1.05 \quad (D)$$

$$0.95 \leq [XX]\text{actual}/[XX]\text{calcd.} < 1.05 \quad (E),$$

wherein [XX] actual, [XY] actual, [XX] calcd. and [XY] calcd. are as defined in claim 1.

6. The copolyermized polyamide of claim 1, wherein said half-crystallization time is in accordance with the following formula (F):

$$4.6 - 0.1(Tm - T) \leq \log t_{1/2} < 5.3 - 0.1(Tm - T) \quad (F),$$

wherein $\log t_{1/2}$, Tm and T are as defined in claim 1.

7. The copolyermized polyamide of claim 1, wherein said temperature at which said half-crystallization time is measured is within a range of 35° C.–25° C. below said melting point of said copolymerized polyamide.

8. The copolyermized polyamide of claim 1, wherein said temperature at which said half-crystallization time is measured is 30° C. below said melting point of said copolymerized polyamide.

9. A process for preparing a copolymerized polyamide as defined in claim 1, comprising the steps of:

forming a primary condensation product, said forming-being conducted under a maximum pressure of 5 kg/cm2-G to 23 kg/cm2-G and under a maximum temperature of 260° C. to 330° C., and melt-extruding said primary condensation product by using a twin-screw extruder, said extruder containing screws, each of said screws having at least one screw segment which satisfies the equation $L/D \leq 2$, wherein L is the length of said screw segment, and D is outermost diameter of said screw segment, wherein said melt-extruding promotes a higher degree of polymerization in said copolymerized polyamide.

10. The process for preparing a copolymerized polyamide of claim 9, wherein said melt-extruding is conducted under a vacuum, and said melt-extruding is performed in accordance with the following relation expressed by formula (G):

$$t \leq 5000 \times \Delta \eta r/(TR - 280) \quad (G)$$

wherein t is residence time of said copolymerized polyamide in seconds; $\Delta \eta$ r is the increase in relative viscosity of said copolymerized polyamide during said melt-extruding; and TR is the maximum temperature attained by said copolymerized polyamide during said melt-extruding.

11. A process for preparing a copolymerized polyamide according to claim 9 or 10, wherein said primary condensation product has a relative viscosity prior to said melt-extruding of 1.15 to 2.5.

12. A process for preparing a copolymerized polyamide according to claim 9 or 10, wherein each of said screws has one or more screw segments which satisfies said equation $L/D \leq 2$, wherein said screw segments comprise 5 to 100% of the length of each of said screws.

13. A process for preparing a copolymerized polyamide according to claim 9 or 10, wherein each of said screws has one or more forward full flight segments, each of said screws also having other screw segments, said other screw segments-comprising one or more screw segments which satisfy said equation $L/D \leq 2$.

14. A process for preparing a copolymerized polyamide according to claim 9 or 10, wherein said melting point of said copolymerized polyamide is 260° to 320° C.

15. A process for preparing a copolymerized polyamide according to claim 9 or 10, wherein said aliphatic diamine has 6 carbon atoms.

16. The process for preparing a copolymerized polyamide according to claim 10 or 11, wherein said structural components (I) and (II) comprise 50 wt % or more of said copolymerized polyamide, and wherein the weight ratio (I)/(II) is in a range from 80/20–20/80.

17. A process for preparing a copolymerized polyamide according to claim 9 or 10 wherein said amide bonds are in accordance with the following formulae (D) and (E):

$$0.95 \leq [XY]actual/[XY]calcd. < 1.05 \quad (D)$$

$$0.95 \leq [XX]actual/[XX]calcd. < 1.05 \quad (E),$$

wherein [XX] actual, [XY] actual, [XX] calcd. and [XY] calcd. are as defined in claim 1.

18. A process for preparing a copolymerized polyamide according to claim 9 or 10, wherein said half-crystallization time is in accordance with the following formula (F):

$$4.6 - 0.1(Tm-T) \leq \log t_{1/2} \leq 5.3 - 0.1(Tm-T) \quad (F),$$

wherein $\log t_{1/2}$, Tm and T are as defined in claim 1.

19. A process for preparing a copolyermized polyamide according to claim 9 or 10, wherein said forming of said primary condensation product is conducted under a maximum pressure within the range 10 kg/cm2-G to 20 kg/cm2-G.

20. A process for preparing a copolymerized polyamide according to claim 9 or 10, wherein said melting point of said copolymerized polyamide is within the range 280° to 320° C., and said maximum temperature under which said primary condensation product is formed is within the range of 20° C. below said melting point of said copolymerized polyamide to 10° C. above said melting point of said copolymerized polyamide.

21. A process for preparing a polymerized polyamide according to claim 9 or 11, wherein said temperature at which said half-crystallization time is measured is within the range from 35° C. –25° C. below said melting point of said copolymerized polyamide.

22. A process for preparing a polymerized polyamide according to claim 9 or 11, wherein said temperature at which said half-crystallization time is measured is 30° C. below said melting point of said copolymerized polyamide.

* * * * *

UNITED STATES PATENT AND TRADEMARK OFFICE
CERTIFICATE OF CORRECTION

PATENT NO. : 5,663,284
DATED : September 2, 1997
INVENTOR(S) : Kazuhiko Kominami, Tooru Nishimura, Kazuhiko Kobayashi and Shoji Yamamoto It is certified that error appears in the above-indentified patent and that said Letters Patent is hereby corrected as shown below:

In Column 3, line 1, please change
"$4.4 - 0.1 (Tm - T) \leq \log t\frac{1}{2} 55 \times 0.1 (Tm - T)$" to
--$4.4 - 0.1 (Tm - T) \leq \log t\frac{1}{2} < 5.5 - 0.1 (Tm - T)$--; and line 35, please change "2.60°" to --260°--.

In Column 4, line 45, please change "45/55-20" to --45/55-80/20--; and
line 47, please change "T/66" to --6T/66--.

UNITED STATES PATENT AND TRADEMARK OFFICE
CERTIFICATE OF CORRECTION

PATENT NO. : 5,663,284
DATED : September 2, 1997
INVENTOR(S) : Kazuhiko Kominami, Tooru Nishimura, Kazuhiko Kobayashi and Shoji Yamamoto It is certified that error appears in the above-indentified patent and that said Letters Patent is hereby corrected as shown below:

In Column 6, line 11, please change
"$4.6 - 0.1 (T_m - T) \leq \log t_{\frac{1}{2}} \leq 5.3 - 0.1 (T_m - T)$" to
--$4.6 - 0.1 (T_m - T) \leq \log t_{\frac{1}{2}} < 5.3 - 0.1 (T_m - T)$--.

In Column 23, line 2, please change "10 or 11" to --9 or 10--.

Signed and Sealed this

Second Day of December, 1997

Attest:

BRUCE LEHMAN

*Attesting Officer*  *Commissioner of Patents and Trademarks*